(12) United States Patent
Lundqvist

(10) Patent No.: US 8,219,728 B2
(45) Date of Patent: Jul. 10, 2012

(54) ARRANGEMENT OF COMPONENTS

(75) Inventor: Anders Lundqvist, Vaxholm (SE)

(73) Assignee: SAAB AB, Linköping (SE)

( * ) Notice: Subject to any disclaimer, the term of this patent is extended or adjusted under 35 U.S.C. 154(b) by 181 days.

(21) Appl. No.: 12/138,816

(22) Filed: Jun. 13, 2008

(65) Prior Publication Data

US 2009/0327542 A1   Dec. 31, 2009

(30) Foreign Application Priority Data

Jun. 13, 2007  (EP) ..................... 07110194

(51) Int. Cl.
*G06F 13/00* (2006.01)
(52) U.S. Cl. ....................... 710/100; 710/110
(58) Field of Classification Search .................. 710/100, 710/110
See application file for complete search history.

(56) References Cited

U.S. PATENT DOCUMENTS

| | | | | |
|---|---|---|---|---|
| 6,122,572 | A * | 9/2000 | Yavnai | 701/23 |
| 7,299,130 | B2 * | 11/2007 | Mulligan et al. | 701/213 |
| 2007/0078943 | A1 * | 4/2007 | Daniels et al. | 709/217 |

OTHER PUBLICATIONS

European Search Report—Nov. 14, 2007.
E. Pastor et al; An Embeded Architecture for Mission Control of Unmanned Aerial Vehicles; IEEE; 2006; pp. 554-560.
Martino Fornasa et al; VISIONS: a Service Oriented Architecture for Remote Vehicle Inspection; IEEE; Sep. 17, 2006; pp. 163-168.
Tong Gao et al; Toward QoS Analysis of Adaptive Service-Oriented Architecture; IEEE; Oct. 20, 2005; pp. 227-236.

* cited by examiner

*Primary Examiner* — Mark Rinehart
*Assistant Examiner* — Jeremy S Cerullo
(74) *Attorney, Agent, or Firm* — Venable LLP; Eric J. Franklin

(57) ABSTRACT

An arrangement for transferring message based communications between separate disjunctive components. The arrangement includes at least two components. At least a first component is arranged to provide services to at least one second component and/or to an operator of the loosely coupled system. At least one message bus is arranged to perform real-time transfers of communications from/to the at least one first component to/from the at least one second component. The at least one message bus is connected to or integrated in an internal communication backbone arranged with a communication member for establishing outgoing communication links. A predetermined message based interface is arranged relative to each of the components and the at least one message bus such that all communications between the at least one first component and the at least one second component are defined in the same single standardized message language. A method for providing components in the arrangement and a platform including the arrangement.

10 Claims, 5 Drawing Sheets

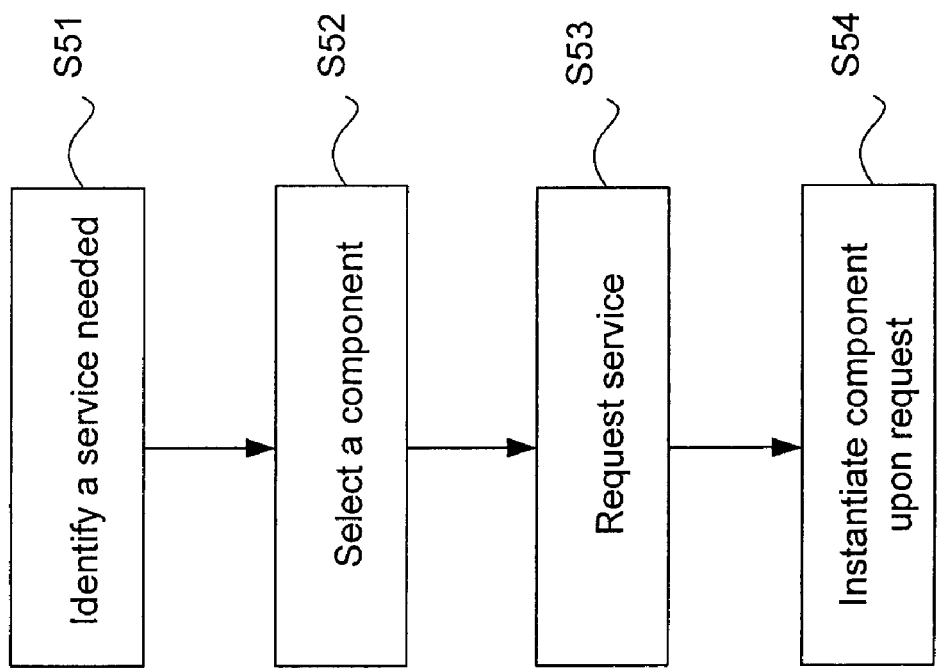
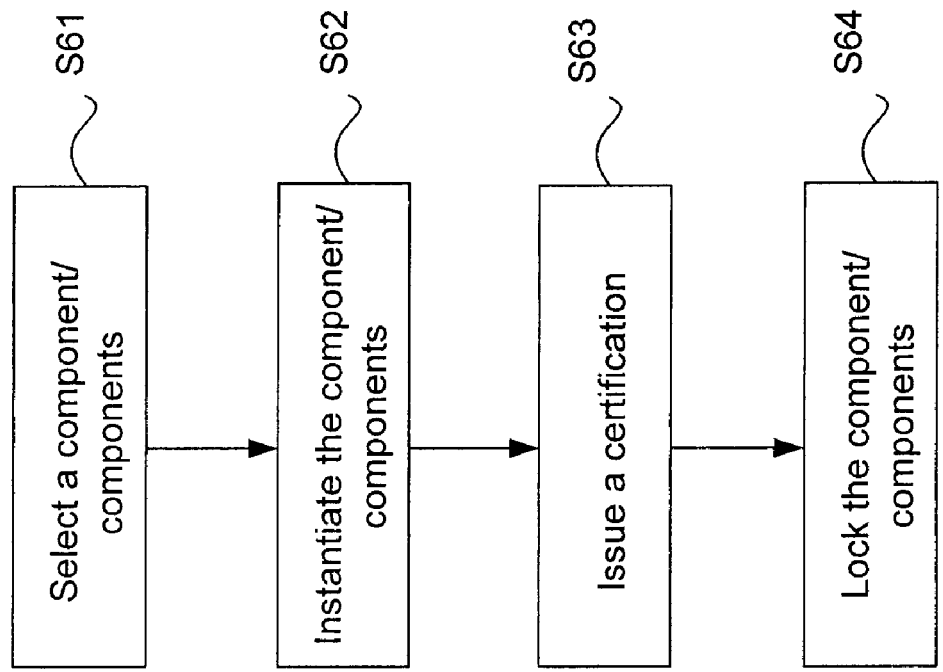

ARRANGEMENT OF COMPONENTS

CROSS-REFERENCE TO RELATED APPLICATIONS

This application claims priority to European patent application 07110194.3 filed 13 Jun. 2007.

TECHNICAL FIELD

The present invention relates to an arrangement of components and in particular to an arrangement of components implemented in a platform such as an unmanned aerial vehicle (UAV).

The present invention also relates to a method for providing components in such an arrangement.

BACKGROUND OF THE INVENTION

Unmanned aerial vehicles (UAV) are vehicles that can be remote controlled or made to fly autonomously based on pre-programmed flight plans or even made to fly by more complex dynamic automation systems.

However, because of the rigorous national and international rules and regulations that specify a wide range of requirements that must be met by such a system and all its integrated parts in order to be approved for aviation, the different parts inside an airborne system in a UAV are designed to work as a tightly coupled integrated system. This is to ensure that the complete UAV system and all its integrated parts as such can be accurately verified, validated and certified for aviation.

By having an airborne system with a tightly coupled integrated system design, it follows that if one part in the airborne system is exchanged for another completely new part, an upgraded part or the like, not only does the new or upgraded part have to be verified, validated and certified for aviation but also the complete integrated airborne system has to be re-verified, re-validated and re-certified for aviation. Thus, because of the often drawn out development process of such advanced airborne systems and since there is a need to constantly update and/or replace different parts of the system so as to incorporate the latest developments, for example, replacing a certain sensor with a more sensitive or accurate sensor, much time and effort is put on performing the more administrative tasks of verification and re-verification, validation and re-validation, and certification and re-certification of each part, subsystem and eventually the complete airborne system.

This also leads to further difficulties as an end-user of a UAV-system almost always has certain specifications depending on the purpose of the system and its intended use. These customizations are very difficult to perform in a tightly coupled airborne system since every adaptation or specific configuration has to go through the approval process described above.

The development of advanced airborne systems, such as UAVs, is often associated with long development cycles and the UAVs are also designed to have long life-span expectancy. This further increases the need in the development of UAVs for a more flexible, simpler and manageable airborne system architecture.

Object of the Invention

It is an object of the present invention to provide a flexible, simple and manageable arrangement of components for a variety of platforms.

SUMMARY OF THE INVENTION

The object of the present invention is achieved by an arrangement for transferring message based communications between separate disjunctive components, wherein the arrangement comprises at least two components, wherein at least a first component is arranged to provide services to at least one second component and/or to an operator of the loosely coupled system, at least one message bus arranged to perform real-time transfers of communications from/to the at least one first component to/from the at least one second component wherein the at least one message bus is connected to or integrated in an internal communication backbone arranged with means for establishing outgoing communication links, a predetermined message based interface arranged relative to each of the components and the at least one message bus such that all communications between the at least one first component and the at least one second component are defined in the same single standardized message language.

An advantage of the invention as describe above is that it allows a builder or producer of a system to keep the system upgraded at all times during the manufacturing process without performing arduous and time-consuming administrative tasks. By providing the flexible and manageable arrangement of components, there is no longer a reason to re-verify, re-validate or re-certify other parts of the system beside the new or upgraded component. This provides a more adaptive, simpler and cost efficient system architecture from a production perspective.

Further advantages achieved by the present invention are that it allows an end-user to customize the system, not only during ordering the system, but also during the manufacturing process or during installation at delivery or even during runtime. It also allows changes and upgrades to be easily incorporated during the entire life-span of the system. This provides a more adaptive, simpler and cost efficient system architecture also from an end-user perspective.

The object of the present invention is further achieved by a platform comprising an arrangement as described above, wherein the platform is chosen from a group comprising unmanned ground vehicles, unmanned submerged vehicles, unmanned naval vehicles and unmanned space vehicles.

The object of the present invention is still further achieved by a method for providing components in an arrangement as described above, comprising the steps of, at runtime: identifying a service which needs to be performed by the loosely coupled system, selecting one of the components for performing the service and instantiating the component upon request of the service from the component by a higher level component or an operator of the loosely coupled system.

Preferably the method also comprises the step of, prior to runtime: selecting one or several of the components, instantiating the one or several of the components and issuing a certification for the instantiated one or several of the components.

BRIEF DESCRIPTION OF THE DRAWINGS

The present invention will be described in more detail in the following, with reference to the appended drawings, in which:

FIG. 5 shows a method for providing components in an arrangement according to a embodiment of the present invention.

FIG. 6 shows a method for providing components in an arrangement according to a further embodiment of the present invention.

DETAILED DESCRIPTION OF THE PREFERRED EMBODIMENTS

The present invention will be described as incorporated in a UAV system, but should be considered extendable to other platforms comprising unmanned vehicles, such as different kinds of ground vehicles, submerged vehicles, naval vehicles, space vehicles etc.

Figure 1:
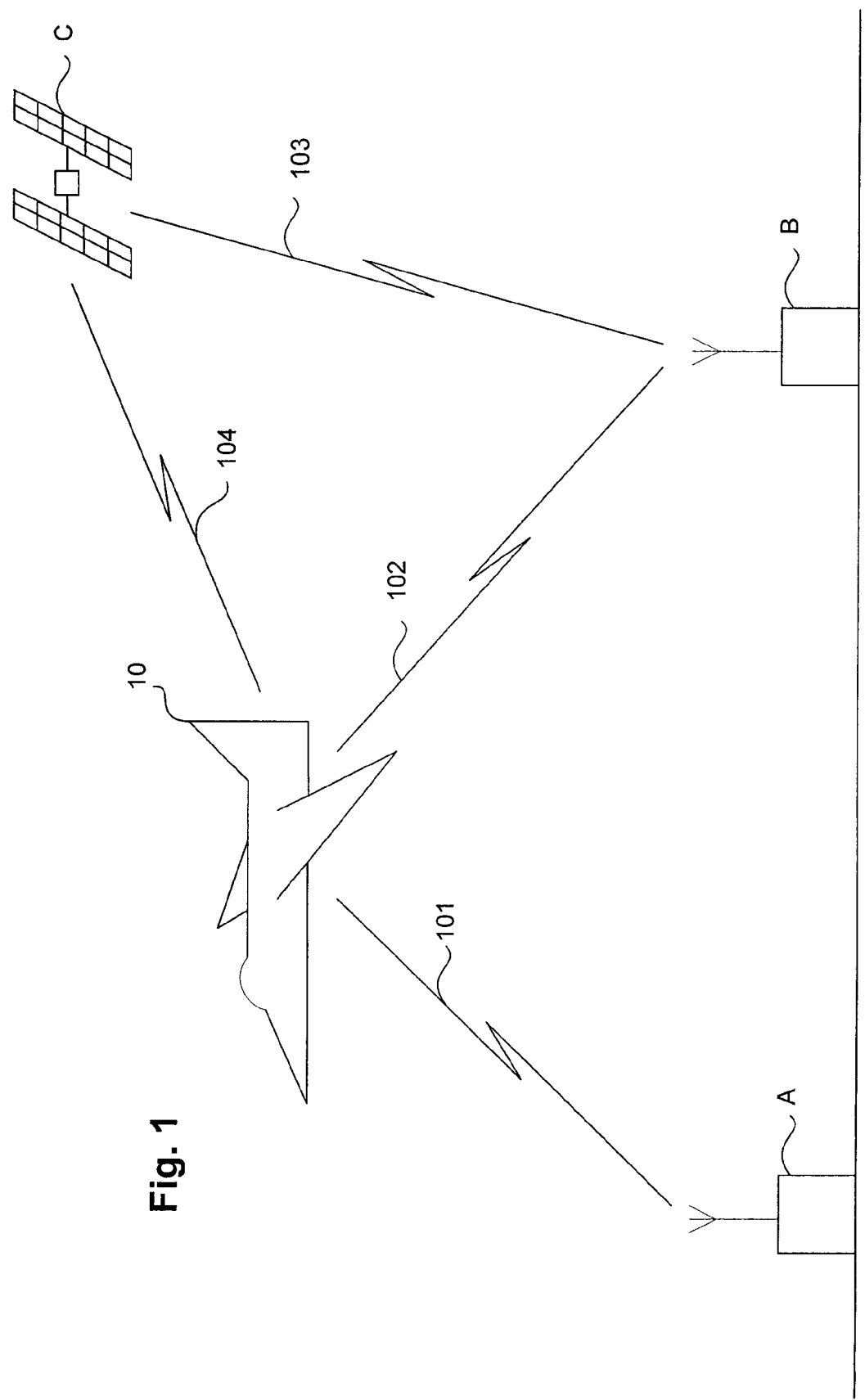
FIG. 1 shows an overview of a UAV system.

A simple overview of a UAV system is shown in FIG. 1. In FIG. 1, an unmanned aerial vehicle (UAV) 10 in flight is in communication with at least one control station A, B through a communication link 101, 102, respectively. The control stations A, B can be arranged to control one or several UAVs 10. The UAV 10 can be arranged to switch between several control stations A, B during flight. A communication link between the UAV 10 and the control station A, B can also be established and relayed via another airborne or spacebased platform, that is, another UAV, aircraft, airship or satellite C as demonstrated by the communication links 103, 104 to achieve an extended range for the UAV 10. Most UAV systems today are essentially designed and built in this way.

An airborne system in a UAV is a distributed complex system with many different outside connections, which requires a multi-layered structure. This is beneficial when trying to isolate and solve different design issues which may arise during development and manufacturing. As in the present invention, by introducing a more service oriented architecture (SOA) for the upper layer, that is, the service layer shown in FIG. 2, and by modifying the middleware layer, also shown in FIG. 2, to support such a system architecture, it is possible to design a loosely coupled federated system wherein stand alone exchangeable service components can be hierarchically organised so as to comprise disjunctive parts in higher level service components. An integral part of the present invention is also that the communication between all components, despite their place or position in the hierarchy, is reduced to message transfers over a standardized message based interface, for example, by using the XML-format (eXtended Markup Language). This ensures that potential dependencies between the service components are eliminated.

Figure 2:
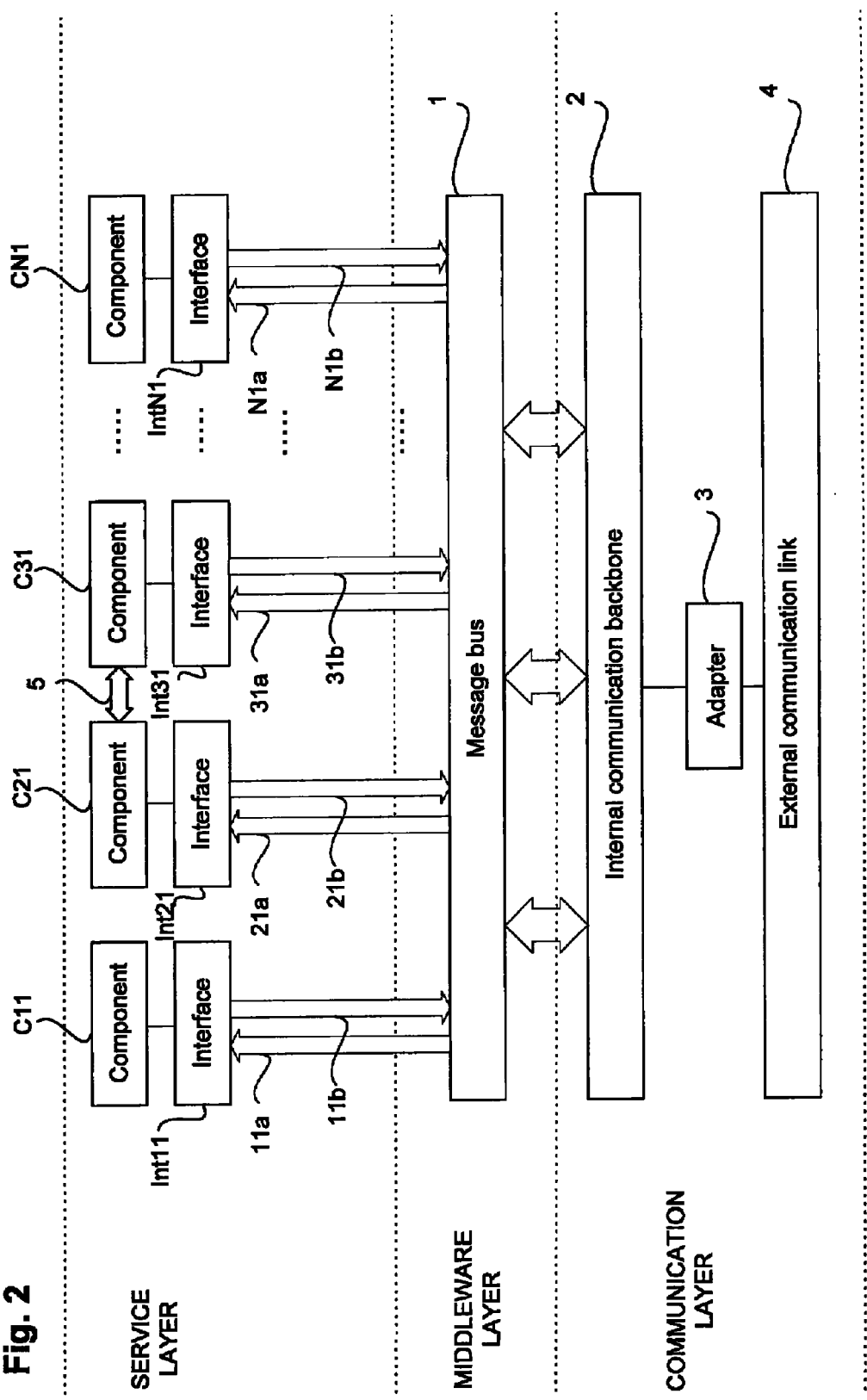
FIG. 2 shows an arrangement according to an embodiment of the present invention.

FIG. 2 illustrates a layered system architecture or arrangement for an airborne system in a UAV according to the present invention.

A lower level communication layer comprises an internal communication backbone 2, an adapter 3 and external communication link 4. The internal communication backbone 2 is a certified communication network for airborne systems. It can be used for internal aircraft data transport as well as for external communication between the aircraft and its environment, such as a control instance, an end-user instance, an air traffic control center (ATCC), a satellite or another aircraft etc. An example of a communication protocol which may be used within the internal communication backbone 2 is the Internet Protocol standard, IP, which may reside on top of Ethernet or other network standards for IP services. The adapter 3 is arranged between the internal communication backbone 2 and the external communication link 4. The adapter 3 is arranged for the message bus 1 in the higher level middleware, described in the following, to be able to communicate externally with the aircrafts' surrounding environment. The adapter 3 may be provided since there is no standardized communication protocol between different airborne systems available today. This instead provides a wide variety of different information management standards, such as, for example LINK16, C2IEDM, ADatP-3 etc, for which the adapter 3 may be arranged to handle. The external communication link 4 may be arranged to provide several of these through external communication links, such as radio or satellite links.

A higher level middleware layer comprises a message bus 1, which can be connected to or integrated in the internal communication backbone 2. The message bus 1 handles all internal aircraft information transfers and controls all communications between components C11, C21, C31, ..., CN1, in an upper service layer, described below. The message bus 1 also comprises information about which components C11, C21, C31, ..., CN1, are present in the upper service layer of the system and controls the flow of information throughout the system and between the components C11, C21, C31, ..., CN1, in the upper service layer. Support for handling global system requirements such as priority, time requirements, routing etc. is also included in the message bus 1, so the message bus 1 can be arranged to perform information transport in real-time and with quality of service (QoS) support from end-to-end.

An upper service layer may comprise N number of components C11, C21, C31, ..., CN1. The outgoing communications 11$b$, 21$b$, 31$b$, ..., N1$b$ of each of the components C11 C21, C31, ..., CN1, through the message bus 3 in the middleware layer, uses the same predetermined message based interface Int1, Int2, Int3, ..., IntN. This means that regardless of the internal operational language of each of the components C11, C21, C31, ..., CN1, all of the outgoing communications 11$b$, 21$b$, 31$b$, ..., N1$b$ are thereby incorporated in messages defined in the single standardized language of the predetermined message based interface Int1, Int2, Int3, ..., IntN. Consequently, since all outgoing communications 11$b$, 21$b$, 31$b$, ..., N1$b$ are defined using the same single predetermined message based interface Int1, Int2, Int3, ..., IntN, all of the incoming communications 11$a$, 21$a$, 31$a$, ..., N1$a$ are also defined in the same single standardized language of the predetermined message based interface Int1, Int2, Int3, ..., IntN. This is also true since the message bus 1 forwards the outgoing communications 11$b$, 21$b$, 31$b$, ..., N1$b$ to the intended recipient without altering, adding or modifying the contents of the communications. The components C11, C21, C31, ..., CN1, are designed to provide services to either other components C11, C21, C31, ..., CN1, or to an operator of the UAV, which may be an end-user, but can also be combined in order to achieve higher levels of functionality.

However, in some cases, there might be a need to establish a direct point-to-point communication 5 between two components C11, C21, C31, ..., CN1. This may be performed because of information security reasons or system performance aspects, for example, transferring heavy data, such as, large images or high quality videos, between components C11, C21, C31, ..., CN1, without burdening the message bus 3. The point-to-point communication 5 may use a Peer-to-Peer (P2P) connection. The components C11, C21, C31, ..., CN1, and their structural hierarchy are described in more detail below with reference to FIG. 3.

An example of the single standardized language of the predetermined message based interface Int1, Int2, Int3, ..., IntN, is the XML, eXtended Markup Language. Other examples that may be used are, for example, HTML (HyperText Markup Language) and SGML (Standard Generalized Markup Language). By using a message based interface Int1, Int2, Int3, . . . , IntN, it is possible to transfer information that carries both a structure and content. The structure is described in the header of the message and the content in the body of the message. In the structure of the message it is indicated how the information is arranged and what type of syntax is used for describing the information. The content is then easily interpreted by the receiving program in the receiving component by simply decoding the structure. The messages may also recursively contain multiple bodies, each with separate headers, which then is described in a main header of the message. The message based interface Int1, Int2, Int3, . . . , IntN, as described above allows the interface to, for example, act more dynamically when handling changes in the system.

Further advantages by using a message based interface Int1, Int2, Int3, . . . , IntN, is that it is expandable without having to rewrite the code for the receiving or sending program in the components. It is the union, that is, the combination, of the information that is sent by a program in one component and received by another program in another component that is transferred, the rest is ignored. This leads to simplicity in building the system and speed in information transference.

In an embodiment of the present invention, the single standardized language of the predetermined message based interface Int1, Int2, Int3, . . . , IntN, is the XML, eXtended Markup Language. By using, as in this case, XML, advantages are taken of a standard with content that is described in plain text and tags that describe the structure. The tags, as well as the structure, of different messages have been defined in a DTD, Document Type Definition. This kind of data description have been well established in, for example, LC2IEDM (The NATO interchange specification: Land Command & Control Information Exchange Data Model). In order to communicate, the programs in the components have knowledge of the DTDs that are defined. In the DTD implementation for the sending and receiving programs of the components, it is controlled what information it is that can be transferred. This gives the components a flexibility to meet changes in the content based upon use and limitations. A simple example of an XML-message is shown below:

| | |
|---|---|
| <coordinates x, y> | "header" |
| 1200 | "body - x" |
| 1100 | "body - y" | wherein the tag, <coordinates x, y>, comprises the header of the message, the first number, 1200, in the body refers to the x coordinate and the second number, 1100, in the body refers to the y coordinate.

Figure 3:
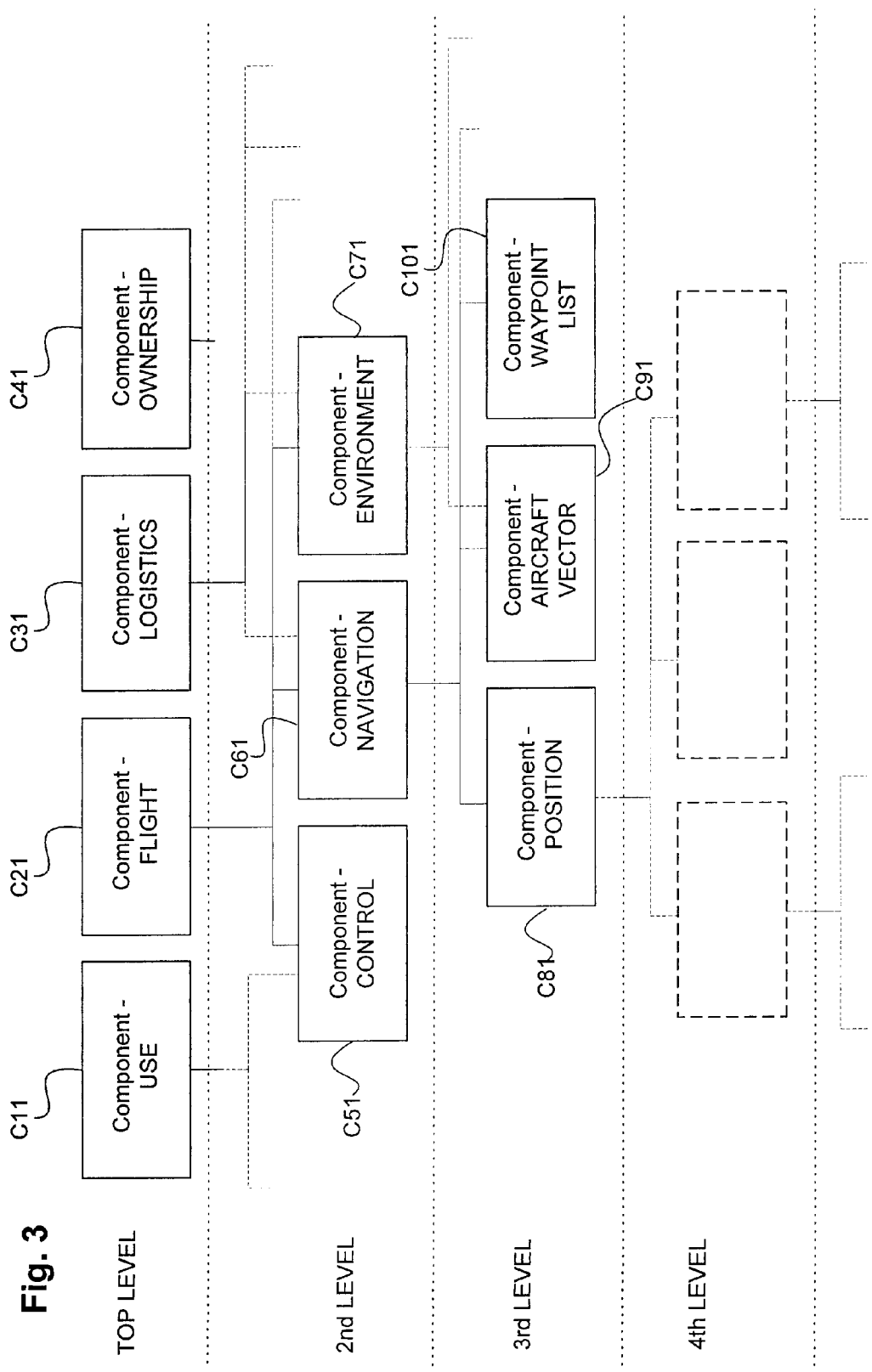
FIG. 3 shows an arrangement according to a further embodiment of the present invention.

Each of the components C11, C21, C31, . . . , CN1, in the upper service layer shown in FIG. 2 is designed to perform a specific service/function. Each of the components C11, C21, C31, . . . , CN1, is placed in an organised hierarchy as shown in FIG. 3. Each of the components C11, C21, C31, . . . , CN1, can only be included as a disjunctive part in an upper level component. The top hierarchical level comprises components performing high level functions. In this embodiment, these are, for example, USE C11, FLIGHT C21, LOGISTICS C31 and OWNERSHIP 41. As an example, the high level function component USE C11 may be used by an operator that wants to use on-board equipment, such as a mounted camera or a weapon etc., the high level function component FLIGHT C21 may be used for controlling the flight path of the UAV, the high level function component LOGISTICS C31 may be used to handle and control different logistics services and also to retrieve information concerning such services, and the high level function component OWNERSHIP C41 may be used to manage the transfer of control of the UAV when switching between control stations A, B.

On the next level, that is the 2nd level according to an embodiment of the present invention, there may be components such as CONTROL C51, NAVIGATION C61 and ENVIRONMENT C71 etc. On the next level, that is the 3rd level according to an embodiment of the present invention, there may be components such as POSITION C81, AIRCRAFT VECTOR C91 and WAYPOINT LIST C101 etc. The organised hierarchy can be stopped at any appropriate level, that is, the M:th level in FIG. 3, by that component being defined as the last, or lowest, level. Examples of a lowest level component could be a sensor, a detector or the like, but also, for example, the component CONTROL C51 which because of certain certification restrictions may has to be implemented as an integrated subsystem. Each of the components C11, C21, C31, . . . , CN1, may perform services for several upper level components simultaneously.

The components C11, C21, C31, . . . , CN1, may also be described in terms of a system. The top hierarchical level is then the system level, wherein the composition of the top hierarchical level comprises a system-of-systems level and all underlying parts comprises subsystem levels and so on, all down to the lowest level of the system. From the outside the subsystems will perform their specified task requiring inputs from other components or an operator as a consumer, for example, time, position, waypoints, thrust, fuel consumption etc., and providing outputs to other components or an operator as a producer, for example, air speed, altitude, velocity, priority, quality, clearance etc. All of the inputs and outputs above are examples of the enormous amounts of parameters that may be required by the components C11, C21, C31, . . . , CN1, or an operator for use in the flight of the UAV.

Each component C11, C21, C31, . . . , CN1 are self aware. In literature describing a SOA, this is also known as "autonomous". But since the term "autonomous" is commonly used in the describing UAVs already, "self aware" is introduced to describe this ability of the SOA components. Self awareness means that each component C11, C21, C31, . . . , CN1 contains information about how to execute its desired function and how to interface with other components through the predetermined message based interface Int1, Int2, Int3, . . . , IntN. All components C11, C21, C31, . . . , CN1 who are self aware all have to use some basic services that allows them to be aware of their environment. Therefore, special components may be arranged to perform different services such as authentication of other components, common time, system navigation etc. Such special components although not all depicted in FIG. 3 may be present on all levels.

An example of such a special component, according to an embodiment of the present invention, is an internal navigation component. The internal navigation component is a look-up component, or "broker", which performs the service of providing means for a consuming component C11, C21, C31, . . . , CN1, to find a requested service that is performed by a producing component C11, C21, C31, . . . , CN1. This may be done by having each of the components C11, C21, C31, . . . , CN1, making its services available by a publish-subscribe methodology. The components C11, C21, C31, . . . , CN1, may through their predetermined message based interface Int1, Int2, Int3, . . . , IntN, present, publish or broadcast their current service capability to the broker, that is, the internal navigation component. The internal navigation component may then capture and catalogue all currently available services and their producing components. Another component C11, C21, C31, ..., CN1, or an end-user of services such as an operator of the UAV-system, may then approach the internal navigation component for service brooking. The requested or selected service and its implementation can thus be allocated to a component or consumers by subscription. When the component or the consumers' need of the selected service has ended, the subscription may be terminated.

Each of the components C11, C21, C31, ..., CN1, is exchangeable as long as the replacing component deliver its new, intended function over the same predetermined message based interface Int1, Int2, Int3, ..., IntN. Since the predetermined message based interface Int1, Int2, Int3, ..., IntN, comprises messages, an exchange of or switch between components may be performed, for example, shifting from one sensor to another, by a command from an operator of the UAV-system, before or even during flight. By performing these types of operations the arrangement according to the present invention can be said to form a loosely coupled system or federated system.

Figure 4:
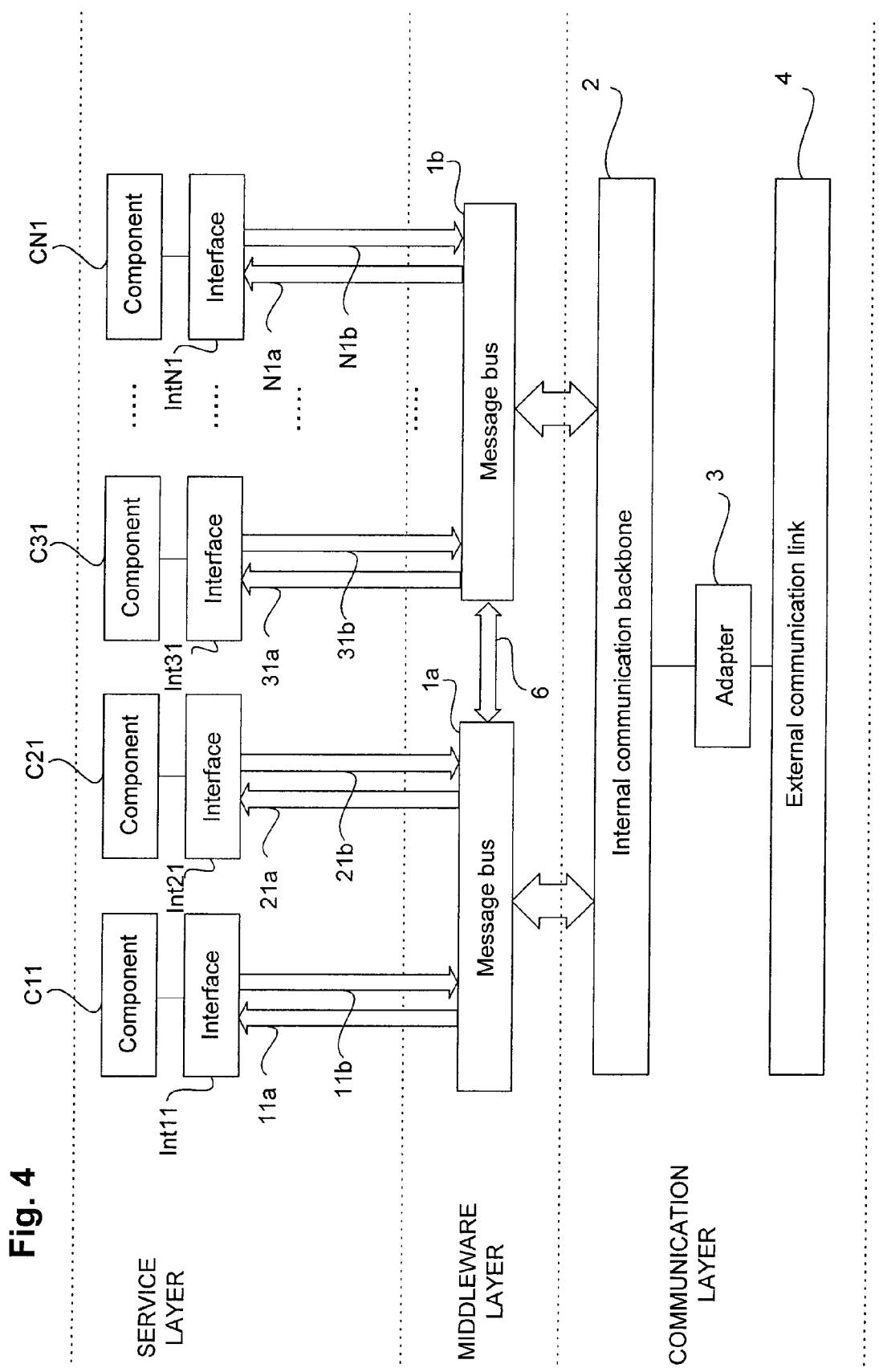
FIG. 4 shows an arrangement according to a still further embodiment of the present invention.

As shown in FIG. 4 and according to a still further embodiment of the present invention, the layered system architecture or arrangement for an airborne system in a UAV may also have multiple message busses 1a, 1b implemented for different subsystems. The subsystems may be connected to and arranged to communicate with each other by, for example, Peer-to-Peer (P2P) connections 6.

In the loosely coupled federated UAV-system according to the present invention as described above, the tightly coupled integration of conventional systems is replaced by an instantiation. Instantiation is a term known from object-oriented programming and development, whereby an object is concretized from a class. A function, that is, a component created and built to perform said function, may be instantiated by choosing one or a few components of several to perform a task, such as, for example, CONTROL C51. Choosing the components may be performed at one of three points in time: at execution (or runtime), at certification or when delivering and installing the UAV-system at an end-user.

Generally, the instantiation of the components is performed in connection with the operative use of the UAV-system, also referred to as at execution or runtime. In special cases, such as certification and air worthiness, the instantiation of the components (and the components included in these components) is performed and locked in connection with a certificate being issued. These special components are created and built in substantially the same way as the rest of the components, although since they are already instantiated and then locked, they can not be changed by the operator of the UAV-system before or during flight. In addition to the FLIGHT C21 component, another example of a component or components which may be isolated and instantiated at fabrication is the USE C11 component, for example, when the USE C11 component includes components such as weapons or the like.

FIG. 5 shows a method for providing components in an arrangement according to an embodiment of the present invention. This method illustrates how a component C11, C21, C31, ..., CN1, may be instantiated upon a service request and is performed at execution or runtime. In step S51, a component C11, C21, C31, ..., CN1, and/or an operator identifies a service needed to be performed. In step 52, a component C11, C21, C31, ..., CN1, is selected by the component C11, C21, C31, ..., CN1, and/or the operator for performing the identified service. Then, in step S53, the identified service is requested from the selected component C11, C21, C31, ..., CN1, by the component C11, C21, C31, CN1, and/or the operator. In step S53, the selected component C11, C21, C31, ..., CN1, is instantiated in response to the request made by the component C11, C21, C31, ..., CN1, and/or the operator to the selected component C11, C21, C31, ..., CN1.

FIG. 6 shows a further method for providing components in an arrangement according to the present invention. This method illustrates how a component C11, C21, C31, ..., CN1, may be issued a certification and is performed prior to execution or runtime. In step S61, one or several of the components C11, C21, C31, ..., CN1, are selected for certification. In step S62, the selected one or several of the components C11, C21, C31, ..., CN1, are instantiated. A certification is then issued for the instantiated one or several of the components C11, C21, C31, ..., CN1, in step S63. In step S64, the one or several of the components C11, C21, C31, ..., CN1, are locked according to the certification.

A UAV-system needs authorisation for operating in common airspace and needs a certificate which ensures that the UAV-system is capable of operating within the laws and regulations for air traffic. Such certificates are only issued to integrated systems, wherein said system can be exactly described and specified in detail and also the performance of which can be fully predicted and described for any given situation. By breaking down the system-of-systems levels into components and by following the principle that, for example, it is only the FLIGHT C21 component on the top hierarchical level that affects the flight of the UAV-system, an isolation of these parts may be performed within the framework of the system architecture as a whole.

This may also be advantageous as some end-users of UAV-systems according to the present invention may not want to use or take advantage of the flexibility associated with having a loosely coupled system. Then, according to the above, the choice of components may be locked on delivery and/or during installation of the UAV-system at the end-user. Thereby, the special case of an integrated system is concretized from the more general so called loosely coupled system.

It can easily be seen that there are two main perspectives on the availability of services according to the present invention, from the end-user side and from the production side. The present invention allows an end-user to customize the UAV-system, not only during ordering the system, but also during the manufacturing process or during installation at delivery or even during runtime. It also allows changes and upgrades to be easily incorporated during the entire life-span of the UAV-system. On the other side, the present invention also allows a builder or producer of a UAV-system to keep the UAV-system upgraded at all times during the manufacturing process without performing arduous and time-consuming administrative tasks. There is no longer a reason to re-verify, re-validate or re-certificate anything outside of the new or upgraded component as this component is incorporated into the system with the same predetermined message based interface Int1, Int2, Int3, ..., IntN, and follows the same principles for message transfers as its predecessor. It therefore allows a simpler way to adapt the UAV-system and provides greater flexibility in customizing the UAV-system according to specific end-user wishes.

The present invention is thus more adaptive and cost efficient than conventional systems from both a production perspective and an end-user perspective. Further, it can be seen that from an end-user perspective the present invention will enhance the ability to tune the system before or during operations. By the present invention it is not only possible to exchange certain parameters, such as in conventional systems in the prior art, but also components and sets of components may be exchanged, for example, by an authorized end-user, as long as the same predetermined message based interfaces Int1, Int2, Int3, . . . , IntN, are not compromised. This will extend the operational use of a platform, which implements a system according to the present invention, without the need to involve specialists to redo system classification and certification.

The invention claimed is:

1. An unmanned aerial vehicle system certified for aviation, the unmanned aerial vehicle system comprising:
   at least two separate disjunctive exchangeable components that are certified for aviation, wherein said disjunctive exchangeable components are hierarchically organized in top-level disjunctive exchangeable components and sub-level disjunctive exchangeable components, wherein said sub-level disjunctive exchangeable components are arranged to comprise disjunctive parts in disjunctive exchangeable components at higher levels, wherein at least a first disjunctive exchangeable component at a sub-level is arranged to provide services to at least one second disjunctive exchangeable component at a higher level and/or to an operator of said unmanned aerial vehicle system;
   at least one message bus arranged to perform real-time transfers of communications from/to said at least one first disjunctive exchangeable component to/from said at least one second disjunctive exchangeable component, wherein said at least one message bus is connected to or integrated in an internal communication backbone comprising an outgoing communication module configured to establish outgoing communication links, wherein the at least one message bus is certified for aviation; and
   a predetermined message based interface arranged relative to each of said first and second disjunctive exchangeable components and said at least one message bus such that all communications between said at least one first disjunctive exchangeable component and said at least one second disjunctive exchangeable component are defined in the same single standardized message language, whereby re-certification of any components beside a new or upgraded disjunctive exchangeable component is avoided in said UAV-system.

2. The unmanned aerial vehicle system according to claim 1, wherein each of said disjunctive exchangeable components is arranged to perform services for several higher level components and/or an operator of said unmanned aerial vehicle system simultaneously.

3. The unmanned aerial vehicle system according to claim 1, wherein each of said disjunctive exchangeable components is arranged to present current service capabilities onto said at least one message bus.

4. The unmanned aerial vehicle system according to claim 3, wherein each of said disjunctive exchangeable components is arranged to request presented services from other components or request a subscription of selected services from other components.

5. The unmanned aerial vehicle system according to claim 3, wherein each of said disjunctive exchangeable components is arranged to also handle requests of services and/or a subscription of services from said operator.

6. The unmanned aerial vehicle system according to claim 1, wherein said single predetermined message based interface is arranged to use one single standardized message language, wherein said language is chosen from a group comprising XML, HTML or SGML.

7. The unmanned aerial vehicle system according to claim 1, wherein at least one of said disjunctive exchangeable components is arranged to perform an instantiation in connection with the operative use of said loosely coupled system at time of execution or runtime.

8. The unmanned aerial vehicle system according to claim 1, wherein at least one of said disjunctive exchangeable components is arranged to perform an instantiation in connection with a certificate being issued.

9. The unmanned aerial vehicle system according to claim 1, wherein at least one of said disjunctive exchangeable components is arranged to perform an instantiation in connection with an installation at delivery of said loosely coupled system to an end-user.

10. The unmanned aerial vehicle system according to claim 1, wherein outgoing communication module comprises an adapter and an external communication link, said adapter being arranged between said internal communication backbone and said external communication link.

* * * * *